United States Patent [19]

Sasaki et al.

[11] Patent Number: 4,838,307
[45] Date of Patent: Jun. 13, 1989

[54] FUEL TANK ARRANGEMENT

[75] Inventors: Michiaki Sasaki; Kiyokazu Yamamoto, both of Kanagawa, Japan

[73] Assignees: Nissan Motor Company, Limited; Jidosha Denki Kogyo Kabushiki, both of Yokohama, Japan

[21] Appl. No.: 906,241

[22] Filed: Sep. 12, 1986

[30] Foreign Application Priority Data

Sep. 18, 1985 [JP] Japan .................. 60-206140

[51] Int. Cl.⁴ .......................... F02M 33/02; F02F 5/02
[52] U.S. Cl. ..................................... 137/574; 137/571; 137/216; 417/151; 123/514
[58] Field of Search ............... 137/216, 565, 571, 574, 137/576, 143, 147, 142; 417/151; 123/514

[56] References Cited

U.S. PATENT DOCUMENTS

| 295,156 | 9/1960 | Bryant | 137/571 X |
| 2,000,741 | 5/1935 | Buckland | 417/151 X |
| 2,171,579 | 9/1939 | Loughridge | 137/147 X |
| 2,479,783 | 8/1949 | Sawyer et al. | 417/151 X |
| 2,631,774 | 3/1953 | Plummer, Jr. | 417/151 |
| 3,021,855 | 2/1962 | Cartwright et al. | 137/142 X |
| 3,455,324 | 7/1969 | Bieri et al. | 137/216 |
| 3,726,310 | 4/1973 | Coscia | 437/576 |
| 3,729,273 | 4/1973 | Shimrony | 417/151 X |
| 4,538,636 | 9/1985 | Cleland | 137/216 |

FOREIGN PATENT DOCUMENTS

| 2440905 | 3/1976 | Fed. Rep. of Germany . |
| 2602234 | 4/1977 | Fed. Rep. of Germany . |
| 57-109921 | 7/1982 | Japan . |

Primary Examiner—John Rivell
Attorney, Agent, or Firm—Foley & Lardner, Schwartz, Jeffery, Schwaab, Mack, Blumenthal & Evans

[57] ABSTRACT

A bottom wall of a fuel tank body defines an inwardly extending projection which separates at least a lower segment of an interior of the fuel tank body into a first fuel chamber and a second fuel chamber. Fuel is pumped out of the first fuel chamber. A portion of the fuel pumped out of the first fuel chamber is returned to the first fuel chamber by way of an ejector pump disposed within the fuel tank body. The ejector pump is driven by the return fuel. A communication pipe connects the second fuel chamber to the ejector pump. The ejector pump transports fuel from the second fuel chamber to the first fuel chamber via the communication pipe.

14 Claims, 2 Drawing Sheets

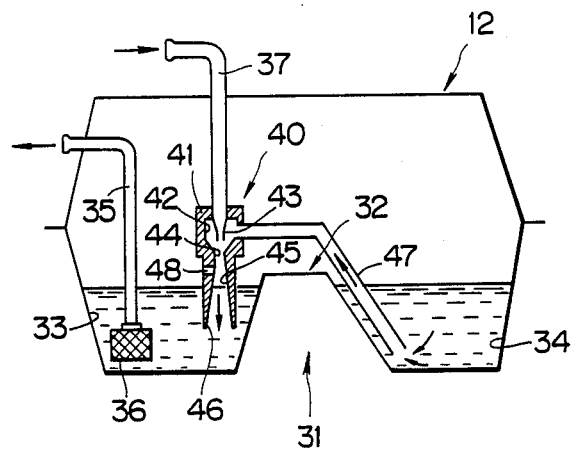
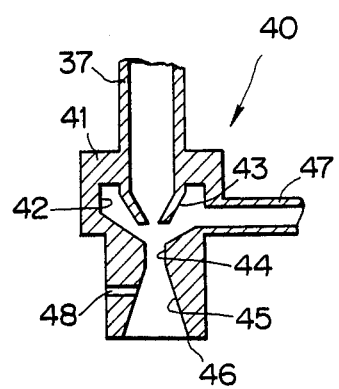
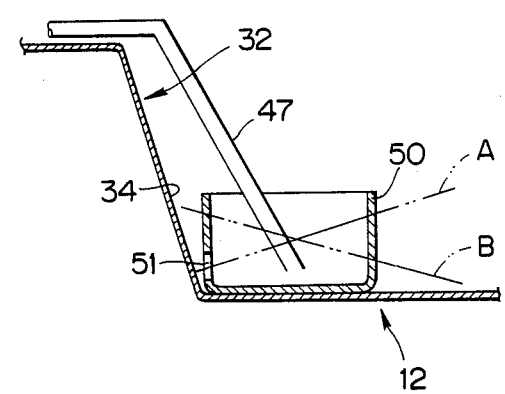

4,838,307

FUEL TANK ARRANGEMENT

BACKGROUND OF THE INVENTION

1. Field of the Invention

This invention relates to a fuel tank arrangement, such as an automotive fuel tank arrangement.

2. Description of the Prior Art

Some automotive fuel tanks have bottom surfaces formed with recesses accommodating other automotive parts. These fuel tank designs enable compact structures of automotive vehicle bodies and prevent interferences between automotive parts.

Japanese Utility Model Publication No. 57-109921 discloses such a fuel tank. A recess in the bottom surface of the fuel tank forms a projection extending into the fuel tank. This projection separates a lower segment of the interior of the fuel tank into a main chamber and an auxiliary chamber. When the level of fuel in the tank decreases below the top of the projection, the fuel separates into two parts held in the main and auxiliary chambers respectively. A fuel feed line forks into two pipes extending into the main and auxiliary chambers respectively. A change-over valve disposed at the point of this fork selectively connects a common segment of the fuel feed line to the change-over valve cooperate to enable both the fuel in the main chamber and the fuel in the auxiliary chamber to be supplied and used fully. The change-over valve and a system controlling the change-over valve cause the whole fuel tank design to be complicated and expensive.

SUMMARY OF THE INVENTION

It is an object of this invention to provide a simple fuel tank arragement including two fuel chambers.

In accordance with this invention, a bottom wall of a fuel tank body defines an inwardly extending projection which separates at least a lower segment of an interior of the fuel tank body into a first fuel chamber and a second fuel chamber. Fuel is pumped out of the first fuel chamber. A portion of the fuel pumped out of the first fuel chamber is returned to the first fuel chamber by way of an ejector pump disposed within the fuel tank body. The ejector pump is driven by the return fuel. A communication pipe connects the second fuel chamber to the ejector pump. The ejector pump transports fuel from the second fuel chamber to the first fuel chamber via the communication pipe.

BRIEF DESCRIPTION OF THE DRAWINGS

FIG. 2 is a diagrammatical section of the fuel tank of FIG. 1.

FIG. 3 is an enlarged section of the ejector of FIG. 2.

FIG. 4 is a sectional view of a portion of a fuel tank arrangement according to a second embodiment of this invention.

Like and corresponding elements are denoted by the same reference characters throughout the drawings.

DESCRIPTION OF THE FIRST PREFERRED EMBODIMENT

Figure 1:
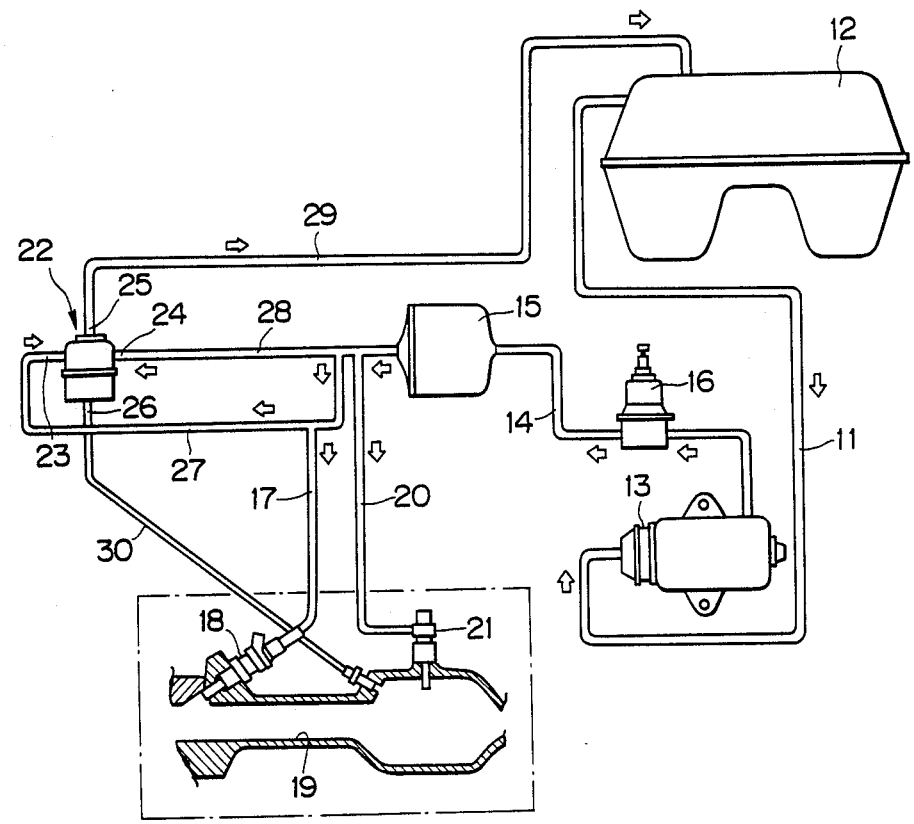
FIG. 1 is a diagram of an automotive fuel supply system including a fuel tank arrangement according to a first embodiment of this invention.

With reference to FIG. 1, an automotive fuel supply system includes a first fuel feed line 11 which connects a fuel tank 12 to the inlet of a fuel pump 13. A second fuel feed line 14 connects the outlet of the fuel pump 13 to the inlet of a fuel filter 15 via a damper or silencer 16. A third fuel feed line 17 connects the outlet of the fuel filter 15 to a main fuel injection valve or valves 18 which allow fuel to be admitted into an engine air intake passage or passages 19. A fourth fuel feed line 20 connects the outlet of the fuel filter 15 to an auxiliary fuel injection valve 21 which allows fuel to be admitted into the engine air intake passage 19.

The fuel pump 13 draws fuel from the fuel tank 12 via the fuel feed line 11 and forces it toward the fuel injection valves 18 and 21 via the fuel feed lines 14, 17, and 20, and via the fuel filter 15. The damper 16 removes pulsation from fuel flow. When a cold engine is started, the auxiliary fuel injection valve 21 is activated to supply additional fuel to the engine.

A pressure regulator 22 has first, second, third, and fourth ports 23, 24, 25, and 26. The first port 23 is connected to the fuel feed line 17 via a fuel passage 27. The second port 24 is connected to the fuel feed line 20 via a fuel passage 28. The third port 25 is connected to the fuel tank 12 via a fuel return line 29. The fourth port 26 is connected to the engine air intake passage 19 via a pressure introduction passage 30.

A portion of fuel driven by the fuel pump 13 deviates from the fuel injection valves 18 and 21 and moves into the pressure regulator 22 via the fuel passages 27 and 28, passing through the pressure regulator 22 and returning to the fuel tank 12 via the fuel return line 29. The pressure regulator 22 adjusts the rate of this fuel return in accordance with the difference between the pressure in the fuel feed lines 17 and 20 and the pressure in the engine air intake passage 19 so that the pressure in the fuel feed lines 17 and 20 relative to the pressure in the engine air intake passage 19 will be maintained at a constant value. In other words, the pressure regulator 22 maintains the pressure across the fuel injection valves 18 and 21 at a fixed level.

As shown in FIG. 2, the lower wall of the fuel tank 12 has horizontal portions. Another portion of the lower wall of the fuel tank 12 extends upwards from the horizontal portions and thus defines a recess 31 in the bottom surfaces of the fuel tank 12 which accommodates other automotive parts (not shown) . The upwardly-extending portion of the tank wall also defines a projection 32 extending into the fuel tank 12. The projection 32 separates a lower segment of the interior of the fuel tank 12 intoo a main fuel chamber 33 and an auxiliary fuel chamber 34. The top of the projection determines the highest fuel level in the main and auxiliary chambers 33 and 34. The main and auxiliary chambers 33 and 34 communicate with one another via an upper segment of the interior of the fuel tank 12.

The fuel feed line 11 includes a fuel feed pipe 35 extending from the main fuel chamber 33 and through a side wall of the fuel tank 12. The inlet of the fuel feed pipe 35 is located near the floor of the main chamber 33. A filter 36 surrounds the inlet of the fuel feed pipe 35. The outlet of the fuel feed pipe 35 leads to the fuel pump 13. The fuel is driven by the fuel pump 13 from the main chamber 33 into the inlet of the fuel feed pipe 35 via the filter 36.

The fuel return line 29 includes a fuel return pipe 37 extending into the fuel tank 12 through the top wall of the fuel tank 12. The inlet or the upstream end of the fuel return pipe 37 leads from the pressure regulator 22. The outlet or the downstream end of the fuel return pipe 37 is connected to an ejector 40 residing within the fuel tank 12.

As shown in Figs. 2 and 3, the ejector 40 includes an approximately cylindrical body 41, the axis of which extends vertically. The body 41 has a closed upper end and an open lower end. The top of the body 41 is higher than the top of the projection 32. The body 41 extends into the main chamber 33. The body 41 defines a coaxially-extending cylindrical ejector chamber 42. The fuel return pipe 37 extends coaxially into the ejector chamber 42 through the top wall of the body 41. The segment of the fuel return pipe 37 within the ejector chamber 42 defines a nozzle 43 through which return fuel is injected into the ejector chamber 42. The nozzle 43 extends coaxially with the body 41. The body 41 defines a circular throat or throttled passage 44 coaxially extending from the lower end of the ejector chamber 42. The body 41 also defines a tapered or conical passage 45 coaxially extending from the lower end of the throttled passage 44 and terminating at a circular opening 46 located in the bottom of the body 41. In this way, the ejector chamber 42, the throttled passage 44, and the tapered passage 45 align axially and extend vertically downward in that order. The bottom opening 46 forms an outlet of the ejector 40 which resides in the main chamber 33. The diameter of the tapered passage 45 increaes in the direction from the throttled passage 44 to the opening 46. The throttled passage 44 and the tapered passage 45 form a diffuser extending from the ejector chamber 42 to the ejector outlet opening 46.

A communication pipe 47 disposed within the fuel tank 12 connects the auxiliary chamber 34 to the ejector 40. An end of the communication pipe 47 is located near the floor of the auxiliary chamber 34. The other end of the communication pipe 47 is connected to the ejector chamber 42. The end of communication pipe 47 connected to the ejector chamber 42 is radially outward of the nozzle 43.

The body 41 has a radial orifice 48 extending from the tapered passage 45 and opening onto the outer surface of the body 41. The orifice 48 extends along a horizontal line having essentially the same height as the top of the projection 32, that is, as the highest fuel level in the main chamber 33.

A portion of fuel driven by the fuel pump 13 returns to the fuel tank 12 via the pressure regulator 22 and the fuel return line 29. The return fuel pressurized by the fuel pump 13 is injected via the nozzle 43 into the ejector chamber 42 toward the throttled passage 44 and the tapered passage 45. The injection of the return fuel causes a vacuum around the nozzle 43 which draws fuel from the auxiliary chamber 34 into the ejector chamber 42 via the communication pipe 47. The injected fuel and the drawn fuel move from the ejector chamber 42 into the throttled passage 44, passing through the throttled passage 44 and moving into the tapered passage 45. After the injected fuel and the drawn fuel pass through the tapered passage 45, they enter the main chamber 33 via the ejector outlet opening 46. In this way, the injected fuel and the drawn fuel move from the ejector chamber 42 into the diffuser, passing through the diffuser and then entering the main chamber 33. When the fuel passes through the throttled passage 44 of the diffuser, the speed of the fuel flow increases.

The ejector 40 serves as a pump driven by the pressurized return fuel and forcing the fuel from the auxiliary chamber 34 to the main chamber 33. The characteristics of the ejector pump depend on the design of the diffuser. The diffuser is designed so as to provide the ejector pump with characteristics appropriate to transport the fuel from the auxiliary chamber 34 to the main chamber 33. Since the ejector 40 transports the fuel from the auxiliary chamber 34 to the main chamber 33 and then the fuel is drawn into the fuel feed pipe 35, the fuel in the auxiliary chamber 34 can be used fully as the fuel in the main chamber 33.

In cases where the fuel level in the auxiliary chamber 34 is higher than the fuel level in the main chamber 33, when the fuel pump 13 is suspended, siphonage continues the transportation of the fuel from the auxiliary chamber 34 to the main chamber 33. It should be noted that the siphonage is ensured, since the ejector chamber 42 and the communication pipe 47 are fully filled with the fuel at the moment of the initiation of the suspension of the fuel pump 13.

In cases where the fuel level in the auxiliary chamber 34 is lower than the fuel level in the main chamber 33, when the fuel pump 13 is suspended, the orifice 48 prevents siphonage so that the fuel does not move from the main chamber 33 to the auxiliary chamber 34.

DESCRIPTION OF THE SECOND PREFERRED EMBODIMENT

FIG. 4 shows a second embodiment of this invention which is similar to the embodiment of FIGS. 1–3 except for the following design changes.

In the embodiment of FIG. 4, a vessel 50 disposed in the auxiliary chamber 34 is secured to the floor of the auxiliary chamber 34. A lower portion of the side wall of the vessel 50 has an opening 51 via which fuel can enter the vessel 50 from the auxiliary chamber 34. The communication pipe 47 extends into the vessel 50. The upstream open end or the inlet of the communication pipe 47 is located near the floor of the vessel 50.

In cases where the amount of the fuel remaining in the fuel tank 12 is small, when the fuel level in the auxiliary chamber 34 inclines as shown by the broken lines A and B of FIG. 4 due to a quick turn of the associated automotive vehicle, the vessel 50 usually holds a considerable amount of the fuel and Keeps the fuel level higher than the inlet of the communication pipe 47 so that the fuel remain drawn into the communication pipe 47.

DESCRIPTION OF THE OTHER PREFERRED EMBODIMENTS

In a first modification to the embodiment of FIGS. 1–3 or to the embodiment of FIG. 4, the fuel pump 13 is disposed within the fuel tank 12. In this case, the inlet of the fuel pump 13 is located near the floor of the main chamber 33, and the outlet of the fuel pump 13 is connected to the damper 16 via a fuel line extending through a wall of the fuel tank 12.

In a second modification to the embodiment of FIGS. 1–3 or to the embodiment of FIG. 4, the whole ejector 40 is located above the main chamber 33. In this case, the outlet opening 46 of the ejector 40 resides in a point above the main chamber 33. This positional arrangement of the ejector 40 prevents siphonage causing a fuel flow from the main chamber 33 to the auxiliary chamber 34. Accordingly, the orifice 48 is omitted from this modification.

What is claimed is:
1. A fuel tank arrangement comprising:
   (a) a tank body having a bottom wall defining an inwardly extending projection which separates at least a lower segment of an interior of the tank body into a first fuel chamber and a second fuel chamber;

(b) a fuel feed pipe having an inlet located in the first fuel chamber;

(c) an ejector body defining an ejector chamber, a throttled passage, a tapered passage, and an ejector outlet opening, the ejecter chamber leading to the tapered passage via the throttled passage, the tapered passage terminating at the ejector outlet opening, the ejector outlet opening being located in the first fuel chamber and being faced towards a bottom wall of the first chamber so that the fuel movement from the second chamber to the first chamber due to a siphonage, is started by a generation of a negative pressure in the ejector chamber due to the ejection of returned fuel from a fuel return line linked with a fuel pump at an ejector nozzle disposed in the ejector chamber and by gravitational free fall of fuel via the fuel return line into the first chamber; and (d) a communication pipe connecting the second fuel chamber to the ejector chamber so that the movement of the fuel from the second chamber to the first chamber is carried out 2. The fuel tank arrangement of claim 1, wherein the inlet of the fuel feed pipe is located near a floor of the first fuel chamber.

3. The fuel tank arrangement of claim 1, wherein an end of the communication pipe is located near a floor of the second fuel chamber.

4. The fuel tank arrangement of claim 1, wherein the ejector chamber, the throttled passage, and the tapered passage are coaxial with each other and extend vertically downward with respect to the tank body.

5. The fuel tank arrangement of claim 1, wherein an end of the communication pipe connected to the ejector chamber is radially outward of the ejector nozzle.

6. The fuel tank arrangement of claim 1, wherein a lower end of the ejector outlet opening is soaked in the fuel in the first fuel chamber and which further comprises means disposed at ejector body for preventing a reverse flow of fuel from the first fuel chamber to second fuel chamber.

7. The fuel tank arrangement of claim 6, wherein the reverse flow preventing means comprises an orifice adjacent to the tapered passage and opening onto an outer surface of the ejector body, the orifice being positioned at an upper portion of the tapered passage which corresponds to a position in the tank body in the vicinity of a maximum level of fuel in the first fuel chamber.

8. The fuel tank arrangement of claim 6, wherein the reverse flow preventing means functions when the fuel pump stops the fuel feed via the fuel feed pipe.

9. The fuel tank arrangement of claim 1, further comprising a vessel disposed in a bottom of the second fuel chamber and having a side opening which allows fuel to enter the vessel from the second fuel chamber, the communication pipe extending into an open top of the vessel and having an end located near a floor of the vessel.

10. The fuel tank arrangement of claim 1, wherein the ejector chamber of the ejector body is placed above a surface of the inwardly extending projection separating the first and second chambers.

11. The fuel tank arrangement of claim 1, wherein a lower end of the ejector outlet opening is spaced apart from a level of the fuel in the first fuel chamber so that the siphonage causing the fuel flow from the first fuel chamber to the second fuel chamber is prevented.

12. An arrangement comprising:
(a) a fuel tank having a bottom wall defining an inwardly extending projection which separates at least a lower segment of an interior of the fuel tank into a first fuel chamber and a second fuel chamber;
(b) means for pumping fuel out of the first fuel chamber;
(c) ejector pump located in a region within the fuel tank outside the second fuel chamber;
(d) means for returning a portion of the fuel, pumped out of the first fuel chamber by the pumping means, to the first fuel chamber by way of the ejector pump and thus allowing the return fuel to drive the ejector pump; and
(e) means for enabling the ejector pump to transport fuel from the second fuel chamber, to the first fuel chamber, the enabling means comprising a communication pipe connecting the second fuel chamber to the ejector pump so that a siphonage action is produced in response to said fuel passing through said ejector pump when the fuel is supplied to the ejector pump via the means returning a portion of the fuel.

13. The arrangement of claim 12, further comprising means for preventing siphonage causing a fuel flow from the first fuel chamber to the second fuel chamber, said preventing means being adjacent a tapered passage in said ejector pump.

14. The arrangement of claim 12, further comprising a vessel disposed in a bottom of the second fuel chamber and having a side opening which allows fuel to enter the vessel from the second fuel chamber, the communication pipe extending into an open top of the vessel and having an end located near a floor of the vessel.

* * * * *